(12) United States Patent
Gerum et al.

(10) Patent No.: US 7,866,761 B2
(45) Date of Patent: Jan. 11, 2011

(54) BRAKING SYSTEM FOR VEHICLES, IN PARTICULAR UTILITY VEHICLES, COMPRISING AT LEAST TWO SEPARATE ELECTRONIC BRAKING CONTROL CIRCUITS

(75) Inventors: Eduard Gerum, Rosenheim (DE); Walter Broch, Asperg (DE); Bence Csák, Budapest (HU); László Gianone, Budapest (HU)

(73) Assignee: Knorr-Bremse Systeme fur Nutzfahrzeuge GmbH, Munich (DE)

( * ) Notice: Subject to any disclaimer, the term of this patent is extended or adjusted under 35 U.S.C. 154(b) by 684 days.

(21) Appl. No.: 10/555,922

(22) PCT Filed: May 6, 2004

(86) PCT No.: PCT/EP2004/004810

§ 371 (c)(1),
(2), (4) Date: Dec. 26, 2006

(87) PCT Pub. No.: WO2004/098967

PCT Pub. Date: Nov. 18, 2004

(65) Prior Publication Data

US 2007/0170774 A1 Jul. 26, 2007

(30) Foreign Application Priority Data

May 8, 2003 (DE) ................................. 103 20 608

(51) Int. Cl.
*B60T 13/00* (2006.01)
*B60T 8/88* (2006.01)
(52) U.S. Cl. ................... 303/9.61; 303/122.15; 303/20; 303/127

(58) Field of Classification Search ..................... 303/3, 303/13, 15, 20, 122, 122.03, 122.04, 122.05, 303/122.08, 127, 199, 122.15, 9.61
See application file for complete search history.

(56) References Cited

U.S. PATENT DOCUMENTS

| 3,566,242 | A | * | 2/1971 | Williams ..................... 320/139 |
| 4,436,347 | A |   | 3/1984 | Stumpe |
| 4,685,745 | A |   | 8/1987 | Reinecke |
| 5,042,883 | A | * | 8/1991 | McCann et al. ................ 303/7 |
| 5,416,401 | A |   | 5/1995 | Neuhaus |

(Continued)

FOREIGN PATENT DOCUMENTS

DE 32 04 185 2/1982

(Continued)

*Primary Examiner*—Thomas J Williams
(74) *Attorney, Agent, or Firm*—Kenyon & Kenyon LLP

(57) ABSTRACT

A braking system for vehicles, including at least one first brake circuit, and at least one second brake circuit, in which the at least one first brake circuit and the at least one second brake circuit each have an electrical control circuit, which respectively has an electronic control unit and its own power supply device, and brake actuating devices which are activatable by the electronic control units, at least one of the brake actuating devices being activatable by more than one of the electronic control units, in which the brake circuits are electrically activatable via a foot brake valve, and the foot brake valve has two electrical braking transmitter devices which are each connected to the electronic control units so that they are DC-isolated.

28 Claims, 5 Drawing Sheets

U.S. PATENT DOCUMENTS

| | | | |
|---|---|---|---|
| 5,427,440 A * | 6/1995 | Ward et al. | 303/3 |
| 5,462,342 A | 10/1995 | Goebels | |
| 6,189,981 B1 | 2/2001 | Niedermeier | |
| 6,410,993 B1 * | 6/2002 | Giers | 303/20 |
| 6,631,320 B1 * | 10/2003 | Holt et al. | 701/83 |
| 6,729,696 B2 * | 5/2004 | Kemer et al. | 303/7 |
| 7,128,376 B2 * | 10/2006 | Williams et al. | 303/15 |
| 2002/0180270 A1 * | 12/2002 | Heckmann et al. | 307/10.1 |

FOREIGN PATENT DOCUMENTS

| | | | |
|---|---|---|---|
| DE | 35 02 049 | | 7/1986 |
| DE | 41 20 337 | | 12/1992 |
| DE | 42 27 083 | | 2/1994 |
| DE | 195 09 150 | | 9/1996 |
| DE | 196 40 148 | | 4/1998 |
| DE | 197 17 686 | | 10/1998 |
| DE | 199 04 721 | | 8/1999 |
| DE | 199 15 253 | | 10/2000 |
| GB | 2400506 A | * | 10/2004 |
| WO | WO 01/62569 | | 8/2001 |

* cited by examiner

BRAKING SYSTEM FOR VEHICLES, IN PARTICULAR UTILITY VEHICLES, COMPRISING AT LEAST TWO SEPARATE ELECTRONIC BRAKING CONTROL CIRCUITS

RELATED APPLICATION INFORMATION

The present application claims the benefit of and was filed as PCT/EP2004/004810 on May 6, 2004 which claims priority to German patent application no. 103 20 608.6, which was filed in the German patent office on May 8, 2003. Both applications (including the English translation of PCT/EP2004/004810 filed herewith) are all hereby incorporated by reference in their entirety.

FIELD OF THE INVENTION

The present invention relates to a braking system for vehicles.

BACKGROUND INFORMATION

DE 199 04 721 A1 refers to an electromechanically actuated vehicle braking system which has electrical braking control circuits, namely one for the brakes on the front axle and one for the brakes on the rear axle. The two control circuits each have their own power supply and their own electronic control unit, which are electrically connected to a brake pedal. The two control units operate independently of one another but can communicate with one another and can thereby detect faults in a control unit. A fault is then deemed to be present when the two control units determine different control signals from the same sensor input signals. In the event of a fault, the two control units are deactivated and the brakes are then controlled by decentralized control units which are assigned to the individual wheels and can perform only simple basic functions.

Modern utility vehicle braking systems have a dual-circuit pneumatic control system and an electronic braking control system, thus making it possible to transmit signals in a more rapid manner and improving the response behavior of the braking system. The costs of electromechanical control components are also frequently lower than the costs of pneumatic control components. Another advantage is the lower outlay on installation. Electropneumatic braking systems, in particular, in which the braking force is applied using compressed air but braking is controlled electronically are customary nowadays. A fundamental "quality criterion" of electrical or electronic braking control systems is their reliability or fail-safety.

DE 199 15 253 A1 refers to a braking system for vehicles, said braking system having two brake circuits and containing, in a central unit, two microcomputers which are each supplied with power from separate power sources. The two microcomputers activate a plurality of brake actuating devices for individual wheel brakes using two separate redundant bus systems. This activation is always effected in a parallel manner using the two bus systems. Measuring devices which are coupled to a brake pedal are provided in order to activate the two microcomputers.

DE 35 02 049 A refers to a brake pressure control device for a motor vehicle having a foot brake valve which transmits signals to an electronic control unit which, for its part, activates pressure-regulating valves for wheel brakes.

WO 01/62569 A refers to an electronic braking control system having three power sources for the power supply. The power sources are decoupled from one another by diodes.

DE 196 40 148 A refers to an electronic braking system having a plurality of vehicle modules which communicate via a data bus. Individual modules are DC-isolated from one another by optocouplers.

DE 195 09 150 A refers to a vehicle braking system having at least two brake circuits, said braking system respectively having a control unit which is controlled microprocessors which are independent of one another. A monitoring computer monitors the two other control units.

DE 32 04 185 A refers to a pressure-medium braking system having a foot brake valve which electrically activates braking control valves.

SUMMARY OF THE INVENTION

It is an object of the exemplary embodiment and/or exemplary method of the present invention to provide a braking system which can be activated electrically, has increased fail-safety or reliability and can, in particular, also carry out higher functions such as ABS, ASR, EBS etc.

This object may be achieved by the subject matter described herein. Advantageous refinements and developments of the exemplary embodiment and/or exemplary method of the present invention are also described herein.

The exemplary embodiment and/or exemplary method of the present invention concerns a braking system comprising at least two or more electrical or electronic braking control systems, individual brake actuators or groups of brake actuators being assigned to different braking control systems, to be precise in such a manner that there are brake actuators which can be activated by a plurality of braking control systems.

In the event of a braking control system failing or developing a fault, control at "critical" wheels is immediately assumed by another braking control system.

The individual braking control systems may be isolated from one another in such a manner that a fault in one of the braking control systems does not affect the other braking control system(s). The individual braking control systems may be DC-isolated from one another.

Despite being isolated, the individual braking control systems may communicate with one another in order to make it possible for another braking control system to rapidly assume the braking control function, in order to coordinate braking activities of brake actuators which are activated by different braking control systems and in order to exchange parameters which have been learnt.

The brake actuators which are activated by the electronic braking control systems may be "pneumatic brake actuators", that is to say in which the braking force is applied pneumatically. This is because, in the case of electrically actuated brake actuators which are currently available, it is not yet possible to build up a satisfactory or sufficient braking force.

The braking system may be arranged to "easily" change over from the electropneumatic brake components used nowadays to purely electrically controlled components.

According to one development of the exemplary embodiment and/or exemplary method of the present invention, the control circuits each have their own electronic control unit and their own power supply. The electrical control circuits activate electropneumatic pressure regulation modules which are supplied with brake pressure by at least two pneumatic supply circuits.

The brake circuits may be divided between individual vehicle brakes in different ways.

One option is to assign a brake circuit to a vehicle axle or group of axles. Each brake circuit may have its own control circuit and its own supply circuit, that is to say one supply circuit and one control circuit are then exclusively assigned to one brake circuit.

Another option is to provide a first brake circuit, which has the function of a service brake circuit, and a second brake circuit, which assumes the function of the service brake circuit, the braking operations being alternately divided equally between the brake circuits. The non-active brake circuit is respectively tested for faults in this state. In the event of a brake circuit failing, the functions are immediately assumed and carried out by the other brake circuit, further changeovers being effected but a faulty function being carried out by a redundant fault-free function. Each brake circuit is respectively provided with its own electronic control unit, said electronic control units being able to communicate with one another via a communications line in such a manner that they are DC-isolated. The service brake circuit may have two separate subsupply circuits which are each connected to their own associated pressure-medium store. The first subsupply circuit is provided, for example, for the purpose of applying pressure to pressure regulation modules on a front axle, and the other subsupply circuit is provided for the purpose of applying pressure to pressure regulation modules on a rear axle. The second brake circuit likewise has its own pressure-medium store.

DETAILED DESCRIPTION

Figure 1:
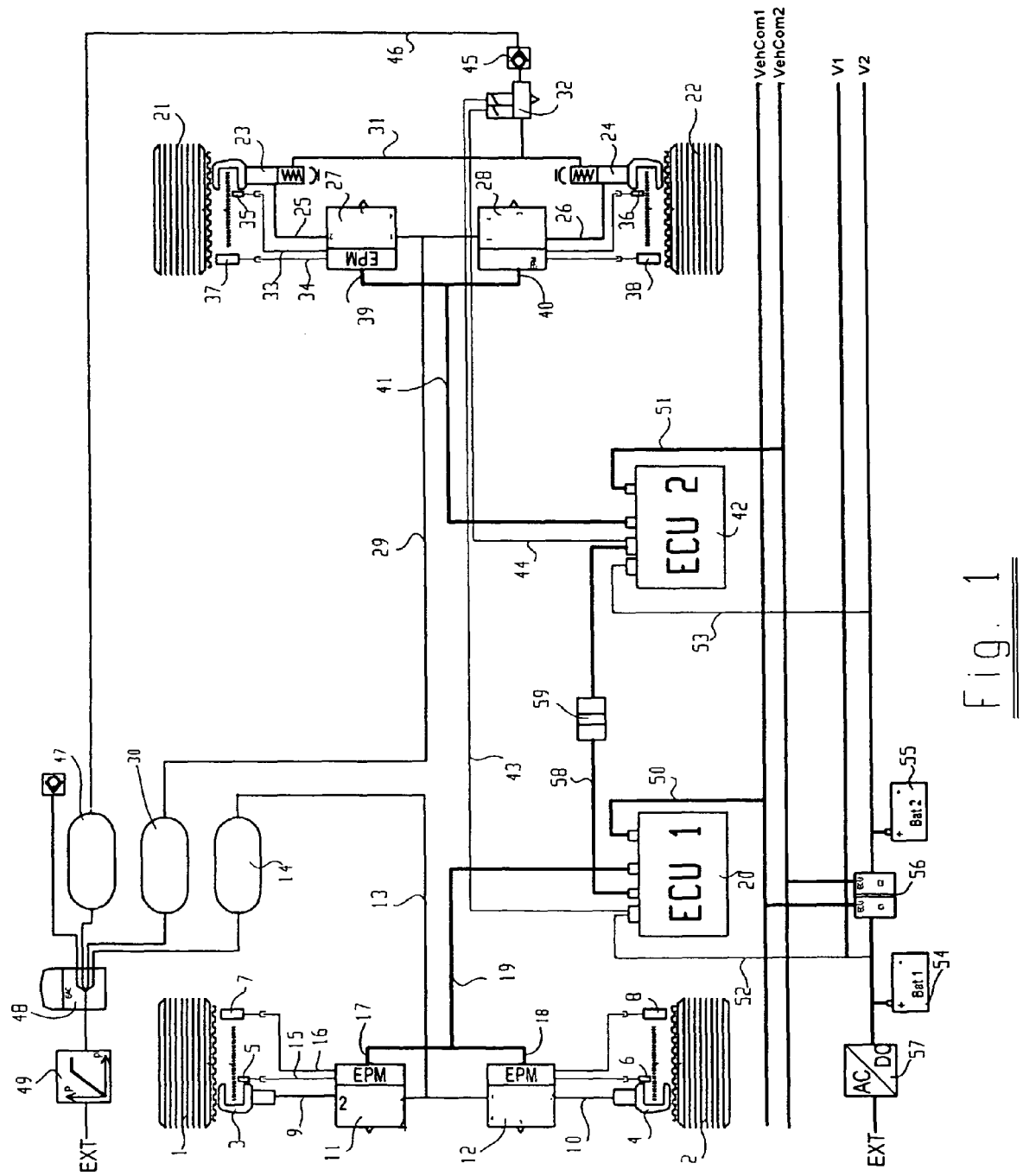
FIG. 1 shows a first exemplary embodiment in accordance with the exemplary embodiment and/or exemplary method of the present invention.

FIG. 1 shows a schematic illustration of an electropneumatic vehicle braking system. Front wheels 1, 2 are each assigned a brake cylinder 3, 4, a brake lining wear sensor 5, 6 and a wheel speed sensor 7, 8. Brake pressure is applied to the brake cylinders 3, 4 by associated electropneumatic pressure regulation modules 11, 12 (EPM) via pneumatic lines 9, 10. The two pressure regulation modules 11, 12 are connected in this case, via a common supply line 13, to a first compressed-air store 14 which is assigned to the front axle. The brake lining wear sensors 5, 6 and the wheel speed sensors 7, 8 are each connected to signal inputs of the pressure regulation modules 11, 12 via electrical lines 15, 16. The pressure regulation modules 11, 12 also each have an electrical control input 17, 18, the latter being connected to a first electronic control unit 20 via electrical lines 19 which are shown only schematically in this case. The electronic control unit 20 thus controls the braking of the front wheel brakes in this case.

Rear wheels 21, 22 are each assigned a spring brake cylinder 23, 24, the latter being connected, via pneumatic brake lines 25, 26, to associated pressure regulation modules 27, 28 which are connected to a second compressed-air store 30 via a supply line 29. The spring brake cylinders 23, 24 are also connected to an electrically activatable locking valve 32 for a common compressed-air line 31.

Like the front axle, the pressure regulation modules 27, 28 are connected to associated brake lining wear sensors 35, 36 and wheel speed sensors 37, 38 via electrical lines 33, 34. The pressure regulation modules 27, 28 have control inputs 39, 40 which are connected, via electrical lines 41 which are shown only schematically in this case, to a second electronic control unit 42 which activates the brakes of the vehicle rear axle in this case.

Figure 4:
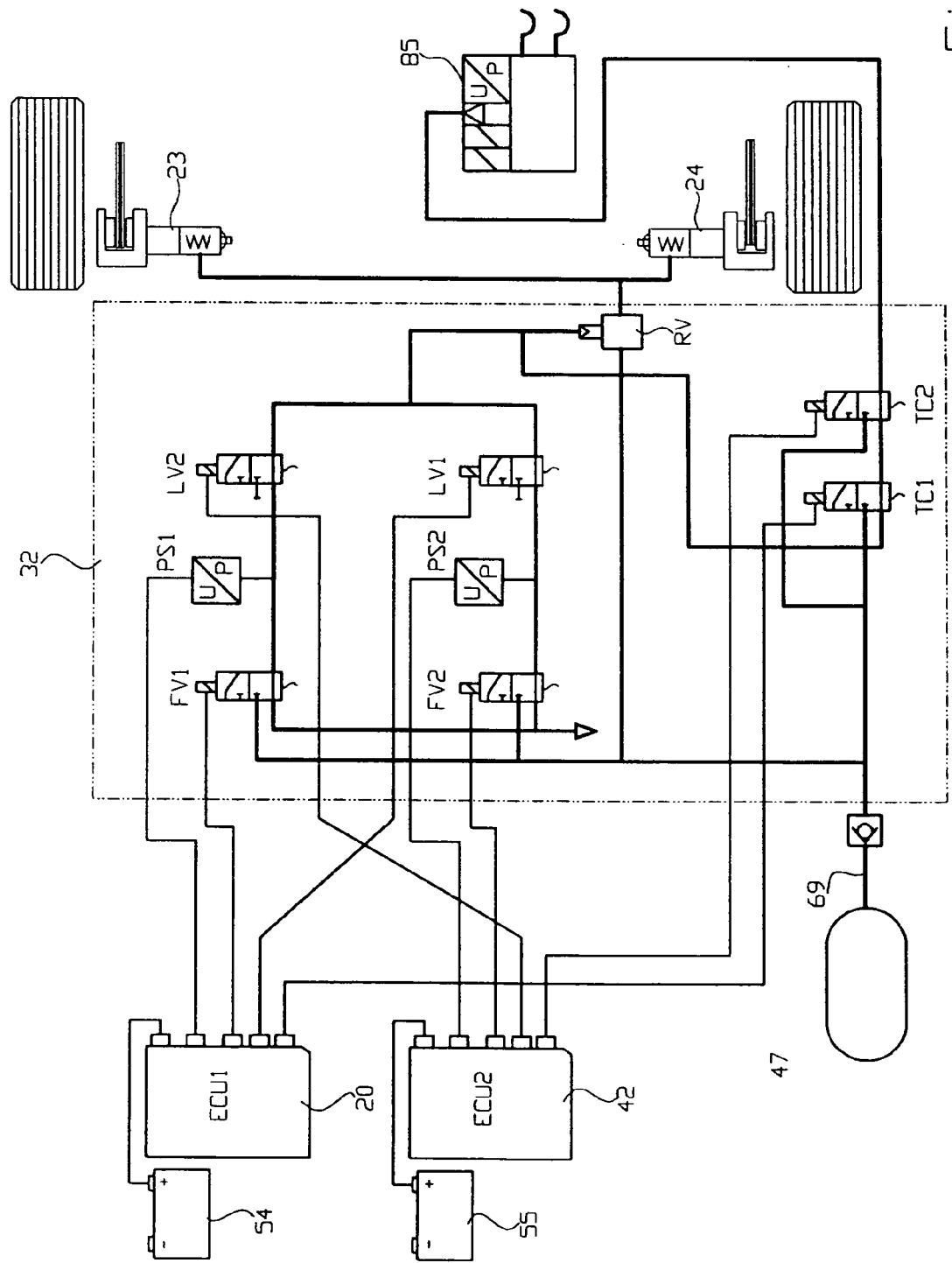
FIG. 4 shows a schematic exemplary embodiment of a parking brake valve.

The parking brake valve 32 which is shown in detail in FIG. 4 and is described therein is connected to the first electronic control unit 20 via an electrical control line 43 and to the second electronic control unit 42 via an electrical control line 44. A pneumatic line 46 also leads from the parking brake valve 32 to a third pressure-medium store 47 via a nonreturn valve 45. The three pressure-medium stores 14, 30 and 47 are each connected to a common pressure distribution device 48 which is fed by a pressure-generating device 49 (compressor).

The two electronic control units 20, 42 are connected to an associated bus VehCom1 and VehCom2, respectively, via electrical lines 50, 51. These bus lines are used to connect the vehicle braking system to other electrical or electronic vehicle systems. In particular, a braking request signal which is prescribed by the driver using the brake pedal is supplied to the electronic control units 20, 42 via these buses.

The electronic control unit 20 is connected to a positive line V1 via an electrical line 52. Accordingly, the electronic control unit 42 is connected to a second positive line V2 via an electrical line 53. The positive line V1 is connected to the positive terminal of a first battery 54 and the second positive line V2 is connected to the positive terminal of a second battery 55. The positive terminals of the two batteries 54, 55 are connected to one another via a DC-isolation device 56, which will be explained in even more detail in connection with FIG. 3.

The positive terminal of the battery 54 is also connected to an AC generator (dynamo) via a rectifier 57.

The two electronic control units 20, 42 are also connected to one another via a communications line 58 and a DC-isolation device 59.

In the case of the braking system shown in FIG. 1, a "dual electronic control system" having two separate power supply devices is provided for the purpose of improving the fail-safety. Even though the two electronic control circuits are DC-isolated from one another, the two batteries 54, 55 can have a common ground connection.

The braking request signal from the driver is supplied to the two electronic control units using electrical brake pedal signals. Mechanical parts have a fail-safe design. By contrast, electronic components are duplicated and are mechanically isolated and DC-isolated from one another.

In FIG. 1, the "division" of the electronic control system corresponds to the "division" of the pneumatic supply circuits, that is to say the supply and control circuits are each divided between the front and rear axles.

Figure 2:
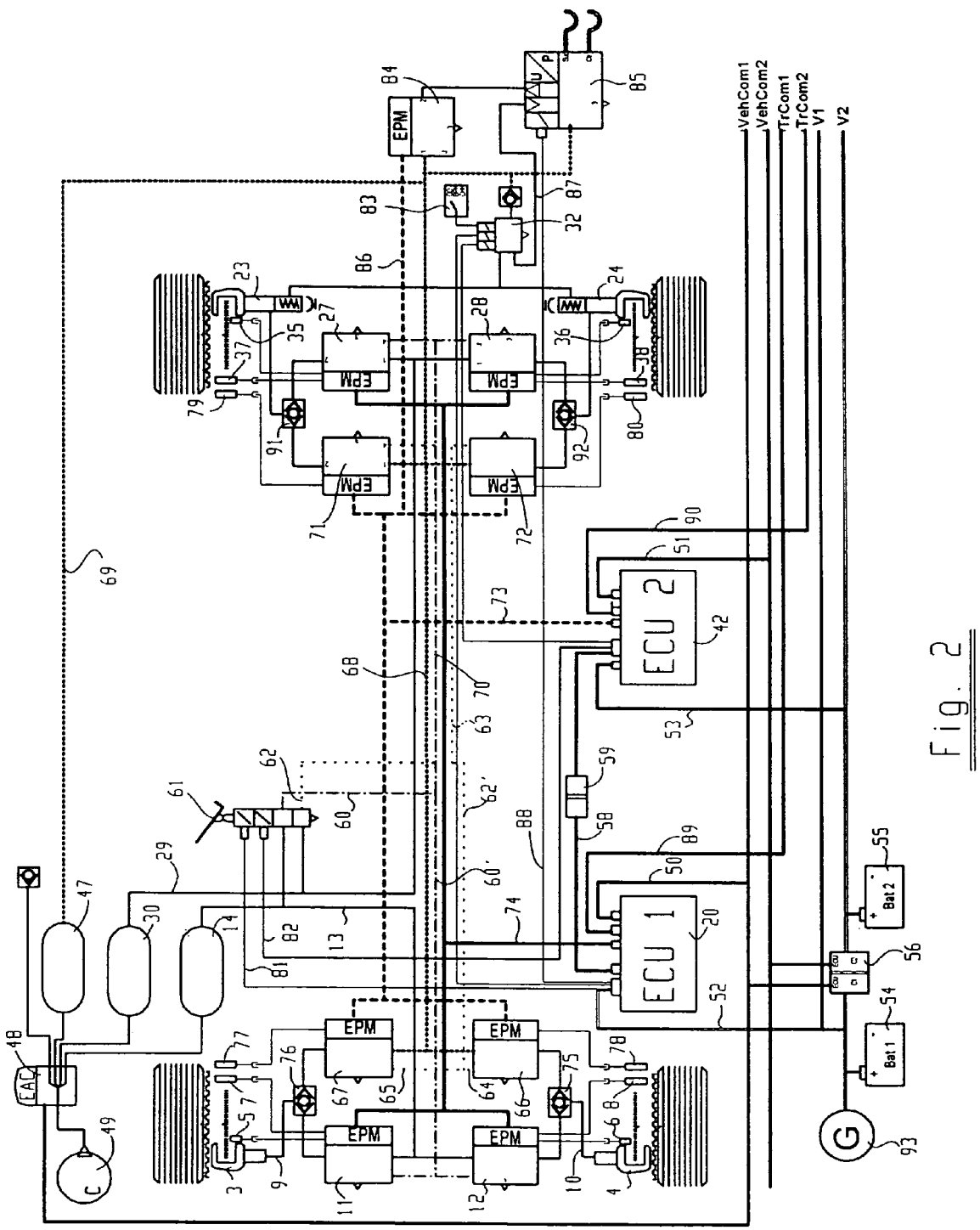
FIG. 2 shows a second exemplary embodiment in accordance with the exemplary embodiment and/or exemplary method of the present invention.

FIG. 2 shows a brake circuit which has been improved further and in which all of the vehicle brakes can be actuated even in the event of a fault in the "primary brake circuit".

FIG. 2 shows a further development of the braking system shown in FIG. 1. In this case too, the braking system has two brake circuits, namely a first brake circuit as the service brake circuit (primary circuit), which controls the braking of all wheels of the vehicle and of a trailer vehicle (which may be present) when the braking system is intact, and a second brake circuit (secondary circuit), which controls the braking of all wheels of the vehicle and of a trailer vehicle (which may be present) if the service brake circuit, that is to say the first brake circuit, has failed.

In this case, the first brake circuit is formed primarily by the pressure regulation modules 11, 12 on the front axle and the pressure regulation modules 27, 28 on the rear axle. Analogously to FIG. 1, the pressure regulation modules 11, 12 are supplied with storage pressure by the first pressure-medium vessel 14 via a pneumatic line 13. The second pressure-medium vessel 30 supplies the pressure regulation modules 27, 28 via the pneumatic line 29.

The pressure regulation modules 11, 12 are also connected to a control output 60 of a foot brake valve 61 via a pneumatic control line 60'. The pneumatic control line 60' is likewise connected to the first pressure-medium vessel 14 via the foot brake valve 61.

The second pressure-medium vessel 30 is connected, via the foot brake valve 61, to a control output 62 of the foot brake valve 61, to which control inputs 64, 65 of pressure regulation modules 66, 67 of the second brake circuit are connected via a control line 62'. The pressure regulation modules 66, 67 of the second brake circuit are also connected to the third pressure-medium vessel 47 via a pneumatic supply line 68, 69.

The pressure regulation modules 27, 28 of the service brake circuit on the rear axle are likewise connected to the pneumatic control output 60 of the foot brake valve 61 via a pneumatic control line 70.

Like the front axle, two further pressure regulation modules 71, 72 of the second brake circuit are also provided on the rear axle, said pressure regulation modules being supplied with compressed air by the third pressure-medium vessel 47 via the pneumatic supply line 68, 69 and likewise being connected to the pneumatic control output 62 of the foot brake valve 61 via a pneumatic control line 63. The pressure regulation modules 66, 67, 71, 72 of the second brake circuit are connected to the second electronic control unit 42 via electrical connecting lines 73. It goes without saying that it is possible to assign the pneumatic control outputs 60, 62 of the foot brake valve 61 to the pressure regulation modules 11, 12, 27, 28, 66, 67, 71, 72 in another manner.

Analogously to this, the pressure regulation modules 11, 12, 27, 28 of the service brake circuit are connected to the first electronic control unit 20 via an electrical line 74.

The pressure regulation modules 11, 67 and 12, 66 are each connected to the brake cylinders 3, 4 via an associated high-pressure selection valve 75, 76 and the pneumatic lines 9, 10.

Analogously to FIG. 1, the brake lining wear sensors 5, 6 and the wheel speed sensors 7, 8 are connected to the pressure regulation modules 11, 12 of the service brake circuit. In addition to this, a second wheel speed sensor 77, 78 is respectively provided in the exemplary embodiment shown in FIG. 2, said wheel speed sensors being connected to the pressure regulation modules 67 and 66 of the second brake circuit.

Analogously to this, wheel speed sensors 79, 80 and brake lining wear sensors 35, 36, which are connected to the pressure regulation modules 71, 72 of the second brake circuit, are also provided on the rear axle in addition to the wheel speed sensors 37, 38 which are connected to the pressure regulation modules 27, 28 of the service brake circuit.

The foot brake valve 61 also has electrical control outputs which are connected, on the one hand, to the electronic control unit 20 via an electrical line 81 and, on the other hand, to the electronic control unit 42 via an electrical line 82. Analogously to FIG. 1, control inputs of the parking brake valve 32 (which additionally has a further manual control input 83 in this case) are connected to the electronic control unit 20 and to the electronic control unit 42.

In addition to FIG. 1, a further pressure regulation module 84 which is connected to a trailer control valve 85 via a pneumatic control line are provided in FIG. 2. The pressure regulation module 84 is supplied with storage pressure by the third pressure-medium vessel 47 via the storage line 69 and is connected to the second electronic control unit 42 via an electrical control line 86. A pneumatic control line 87 for the parking brake of a trailer vehicle is also provided between the parking brake valve 32 and the trailer control valve 85. The trailer control valve 85 is likewise connected to the first electronic control unit 20 via an electrical control line 88.

Analogously to FIG. 1, the two electronic control units 20, 42 are connected to the positive terminals V1 and V2 via the lines 52, 53 and to bus lines VehCom1 and VehCom2 via the lines 50, 51. Connecting lines 89, 90 to TrCom1 and TrCom2 connections are additionally provided in this case, said connections leading to a trailer. Power supply via the batteries 54, 55 corresponds to FIG. 1. In contrast to FIG. 1, the pressure distribution device 48 is likewise connected to the VehCom1 bus here, can isolate a faulty compressed-air supply circuit and maintains the requisite system pressure for all of the other circuits.

Like FIG. 1, the two electronic control units 20, 42 are connected to one another via the electrical line 58 and the DC-isolation device 59. This connection prevents an actuator, for example, being activated by different control devices at the same time.

Analogously to the front axle, the pressure regulation modules 27, 71 and 28, 72 are also each connected, on the rear axle, to inputs of the spring brake cylinders 23, 24 via a high-pressure selection valve 91, 92.

The high-pressure selection valves (high select) 75, 76, 91, 92 ensure that the higher of the two brake pressures of the connected brake circuits is respectively transmitted to the brake cylinders. During normal operation, the service braking system "overrides" the second braking system, the pressures in the second brake circuit being somewhat lower than in the service brake circuit. This ensures reliable pressure control and makes it possible for the second brake circuit to check its own "operational capability", for example by measuring the pressure at the outputs of the pressure regulation modules 66, 67 and 71, 72 of the second brake circuit, that is to say upstream of the high-pressure selection valves 75, 76, 91, 92.

The valve components are now present "singly" from the output of the high-pressure selection valves 75, 76, 91, 92. They are accordingly of failsafe design.

The uppermost level of the electronic control system of the braking system is implemented using the two electronic control units 20, 42 (main electronic control unit and second electronic control unit). The two electronic control units have two communications connections 58, 59 which are independent of one another and are DC-isolated from one another. These "connecting lines" can be used to carry out plausibility checks on the two independent circuits. "Learnt" and instantaneous or measured braking parameters can also be exchanged. The "main ECU" (electronic control unit 20) controls all of the vehicle brakes during normal operation and also if the second system has developed a fault or has failed.

In the event of the main braking system failing, the second system controls braking. The main system has a pneumatic pressure supply via the pressure-medium store 14 for the front axle and via the pressure-medium store 30 for the rear axle and controls the pressures using the associated pressure regulation modules 11, 12, 27, 28.

In order to increase reliability, two wheel speed sensors are provided at each wheel, one being assigned to the respective pressure regulation module of the service brake circuit and the other being assigned to the associated pressure regulation module of the second brake circuit.

The foot brake valve 61 is connected to the two ECUs, that is to say to the electronic control units 20, 42, with the result that DC-isolation is ensured, thus enabling plausibility checks.

Each ECU has a data connection to its associated superordinate control unit, from which external braking requests can be accepted. These data connections must, of course, be DC-isolated from the two braking control circuits.

The parking brake is activated exclusively electronically by the two independent ECUs and is directly activated electrically by the driver, to be precise in the following manner. Electrical actuation of the parking brake by the driver precedes electronic control by the two ECUs. However, the parking brake is released only when there are release signals from the ECUs and from the driver.

Figure 3:
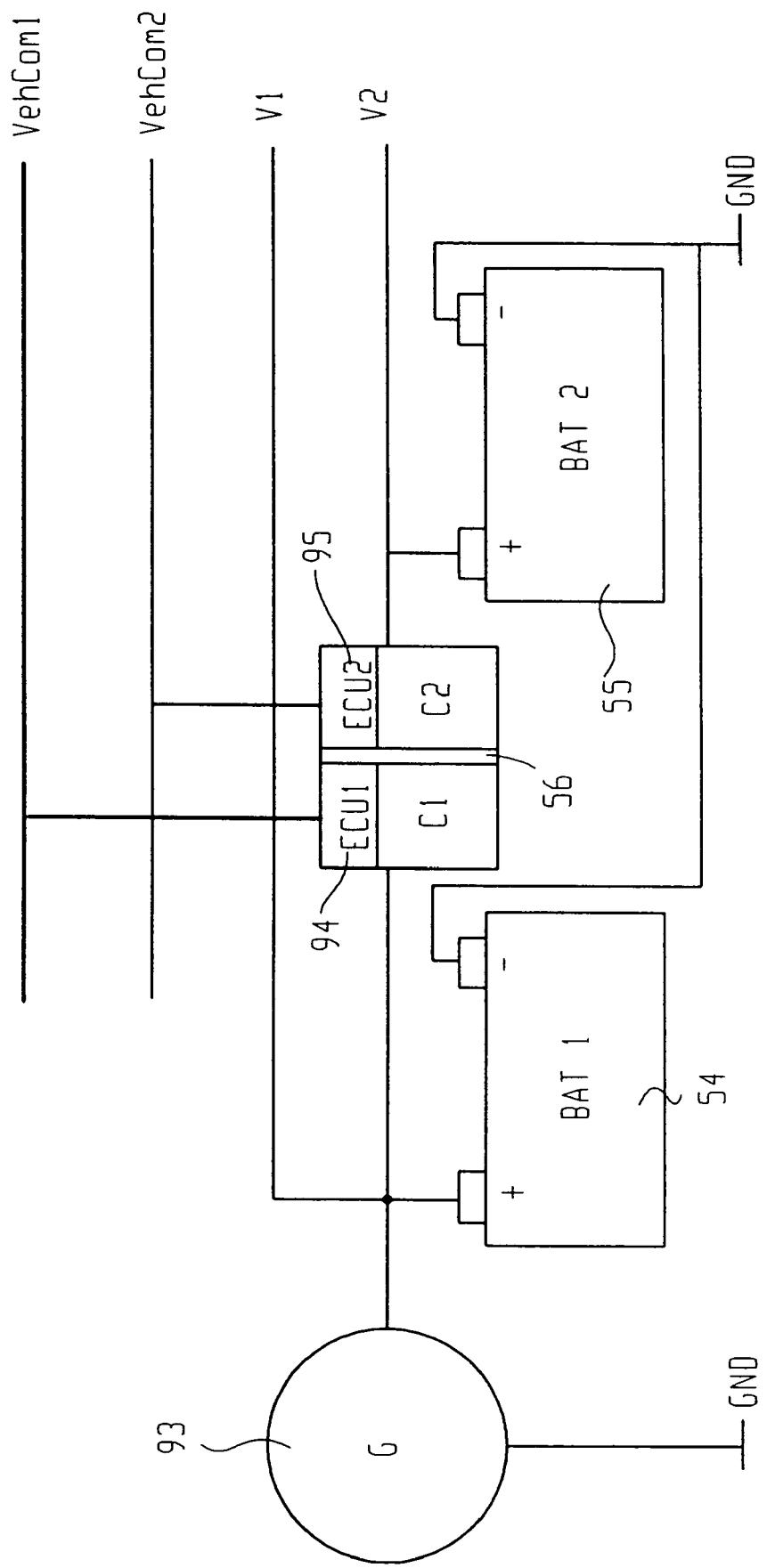
FIG. 3 shows a basic circuit diagram of the power supply system for the two braking control circuits.

FIG. 3 shows an enlarged illustration of the power supply system for the braking control system shown in FIG. 2. A generator 93 (dynamo) generates a voltage and is connected to the positive terminal of the battery 54 and to the DC-isolation device 56 (supply duplicator unit). The positive terminal of the battery 55 is likewise connected to the DC-isolation device. The positive terminals of the two batteries 54, 55 are thus DC-isolated. The DC-isolation may be realized, for example, using a converter with electromagnetic transmission.

The negative terminals of the two batteries 54, 55 and the generator 93 each have a common ground connection (GND). The potential V1 can be tapped off from the positive terminal of the battery 54 and the potential V2 can be tapped off from the positive terminal of the battery 55. The isolation device 56 also has electronic monitoring units 94, 95 which are connected to the bus lines VehCom1 and VehCom2. The electronic monitoring units 94, 95 monitor and control the charging and discharging operations, to be precise in such a manner that the lives of the batteries are optimized.

Since not all of the electrical systems in a vehicle are relevant to safety, not all of the systems need to be "duplicated" either. The power supply system is therefore of "asymmetrical" design.

The main system, that is to say, for example, the battery 54, supplies power to all of the main loads, for example starter, lights, drive controller, the primary electronic braking control circuit, the primary electronic steering control circuit etc. The secondary system, that is to say the battery 55, supplies power to the "subordinate" back-up components of all the safety-relevant systems, that is to say the electronic back-up braking control circuit and an electronic back-up steering control circuit.

On account of the "asymmetry", the second battery may have a smaller capacity than the first, and another type of battery may also be used. The batteries 54, 55 are thus matched to one another in terms of size, capacity, charging and discharging curves etc.

The AC generator 93 (dynamo) charges the first battery 54 and—in a DC-isolated manner—also the second "back-up battery" 55. In the event of a fault in a supply circuit, the "supply duplicator unit" 56 and the electronic monitoring units ensure the integrity of the other circuit.

Optimum use of the batteries requires charging and discharging methods which are matched to the batteries, this being monitored by the electronic control devices 94, 95. The charging and discharging operations are thus intended to be carried out, as far as possible, in accordance with prescribed "charging and discharging curves". The electronic control devices 94, 94 are thus used as "intelligent charging and discharging control devices".

Since, in the case of fully electronic control of safety-relevant systems, the state of the batteries is a very important item of information, the isolation device 56 has two DC-isolated data connections (not shown) via which battery state signals are transmitted.

FIG. 4 shows a schematic exemplary embodiment of the parking brake valve 32. It comprises two function valves FV1, FV2, two locking valves LV1, LV2, two pressure sensors PS1, PS2 and two trailer check valves TC1, TC2. The valves FV1 and LV2 switch the upper air path of the parking brake valve 32, and the valves FV2 and LV1 switch the lower air path. The valves FV1 and LV1 are controlled by the first electronic control unit 20, and the valves FV2 and LV2 are controlled by the electronic control unit 42. Normally, the function valves FV1, FV2 control the functioning of the parking brake. In the event of a fault in a function valve (for example FV2), the associated locking valve LV1 will block the faulty air path.

A relay valve RV is a power valve and is controlled by the valves FV1, FV2, LV1, LV2 since the latter are not capable of actuating the spring brake cylinders 23, 24 rapidly enough.

The trailer check valves TC1, TC2 are responsible for checking the spring brake action.

If the function valve FV1 or its controller has a fault, the locking valve LV2 is actuated and the upper air path is thus blocked. In this case, correct functioning is still ensured by the function valve FV2 and the locking valve LV1.

If the locking valve LV2 or its controller has a fault, the two function valves FV1, FV2 must still be activated, and correct functioning is thus still maintained.

In order to detect faults in the parking brake system, use is made of two pressure sensors PS1, PS2 which are interrogated in the switching sequences of the function valves FV1, FV2 and locking valves LV1, LV2.

In the event of all the electrical supply voltages failing, the parking brake valve 32 will brake.

Figure 5:
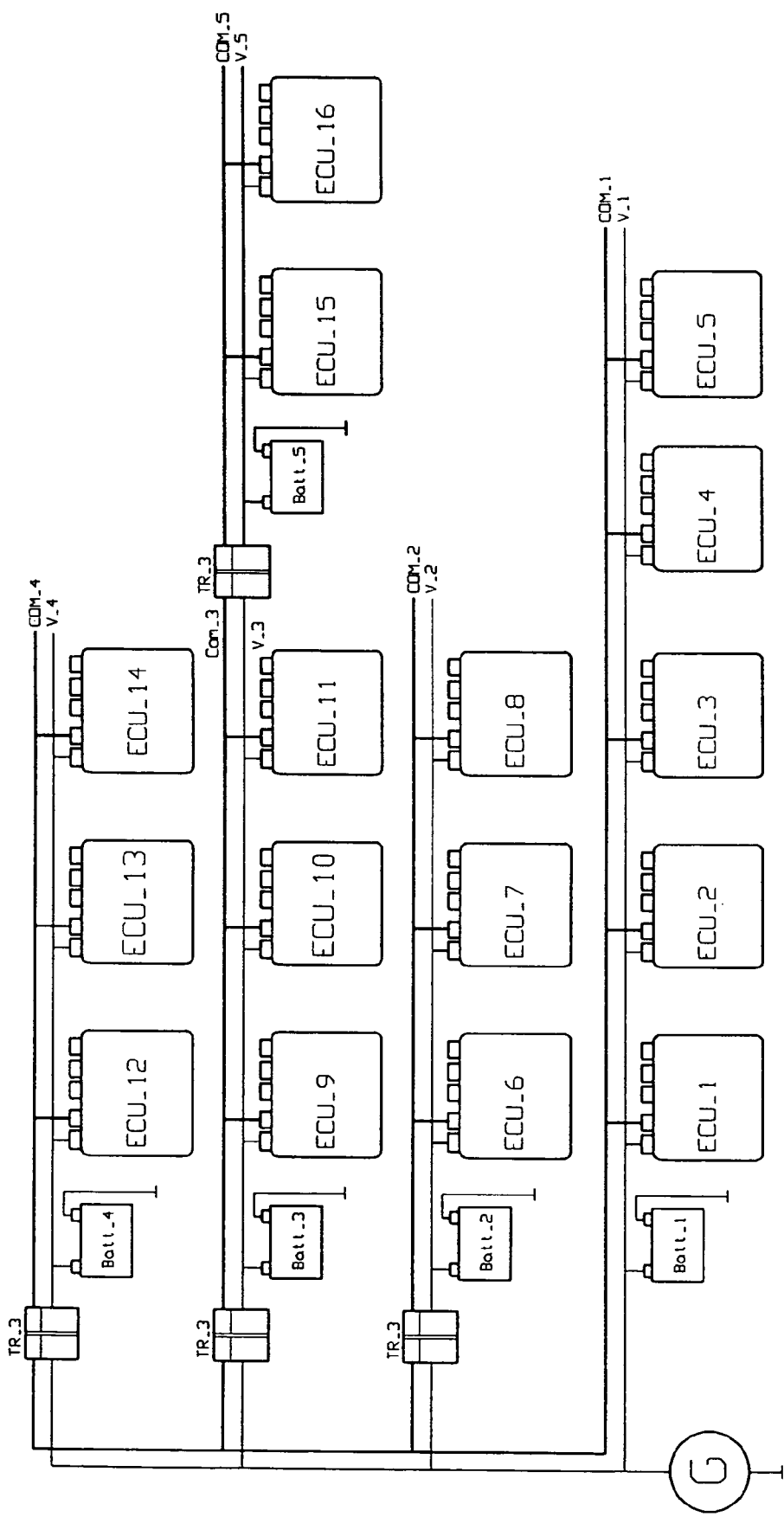
FIG. 5 shows a schematic illustration of networked electronic control systems.

FIG. 5 shows a schematic illustration of networked electronic control systems having multiple redundancy levels. Only control systems ECU_1 to ECU_16 with their supply lines and communications connections are shown. The control systems are arranged in system groups. ECU_1 to ECU_5 are the basic systems, for example brake, steering, vehicle dynamics, engine control, transmission control etc. These systems are supplied by a power generator G via a supply line V_1. The associated energy store is a battery BATT_1. The next group is formed by the control systems ECU_6 to ECU_8, which group is also supplied by the power generator G. However, the supply line contains a transducer TR_1, to which a supply line V_2 is connected. The group of control systems ECU_6 to ECU_8 are the most safety-critical redundant pairs of the control systems ECU_1 to ECU_5 (for example brake 2, steering 2, vehicle dynamics 2).

The communications lines of the control systems are also isolated from one another by transducers. A communications connection thus exists, for example, between the control systems ECU_1 to ECU_8 by virtue of the communications line COM_1 which is connected to a communications line COM_2 of the control systems ECU_6 to ECU_8 by the transducer TR_1.

FIG. 5 shows quadruple redundancy in which four transducers TR_1 to TR_4 are used.

The position of the control systems ECU_15 to ECU_16 shows another possible way of using transducers. These control systems are connected to one another by means of a supply line V_5 and a communications line COM_5 and are connected to the transducer TR_4. The transducer TR_4 forms the connection to the supply line V_3 and to the communications line COM_3 which are, in turn, connected to the supply line V_1 and to the communications line COM_1 by means of a further transducer TR_2.

The transducers TR_1 to TR_4 form DC-isolation devices between the various redundancy levels.

The invention claimed is:

1. A braking system for vehicles, comprising:
    at least one first brake circuit; and
    at least one second brake circuit, wherein the at least one first brake circuit and the at least one second brake circuit each have an electrical control circuit, which respectively has an electronic control unit and its own power supply device, and brake actuating devices which are activatable by the electronic control units, at least one of the brake actuating devices being activatable by more than one of the electronic control units;
    wherein the brake circuits are electrically activatable via a foot brake valve, and the foot brake valve has two electrical braking transmitter devices which are each connected to the electronic control units so that they are DC-isolated,
    wherein the two power supply devices are batteries, a second battery being connected to a first battery via a DC-isolation device and being chargeable via the first battery, and
    wherein the DC-isolation device has an electronic monitoring unit to monitor states of charge of the batteries.

2. The braking system of claim 1, wherein the electrical control circuits are DC-isolated from one another.

3. The braking system of claim 1, wherein the electronic control unit of the first brake circuit is connected to the electronic control unit of the second brake circuit via a communications line, the communications line having a device for DC-isolating the two control circuits.

4. The braking system of claim 1, wherein the two control circuits have a common ground connection.

5. The braking system of claim 1, wherein the electronic control units are connected to other electrical or electronic vehicle systems so that they are DC-isolated.

6. The braking system of claim 1, wherein the brake actuating devices are electropneumatic pressure regulation modules, and wherein there are at least two separate pneumatic supply circuits for supplying the pressure regulation modules with brake pressure.

7. The braking system of claim 6, wherein the supply circuits are each assigned to a vehicle axle or a group of axles.

8. The braking system of claim 6, wherein a brake circuit is respectively assigned precisely one control circuit and precisely one supply circuit.

9. The braking system of claim 1, wherein the first brake circuit is assigned to the brakes on the front axle and the second brake circuit is assigned to the brakes on the rear axle.

10. The braking system of claim 1, wherein, under the control of the electronic control units, the second brake circuit assumes the function of the first brake circuit if the latter fails and the first brake circuit assumes the function of the second brake circuit if the latter fails.

11. The braking system of claim 1, wherein the electronic control units of brake circuits are connected to one another via communications lines, the communications lines having devices for the DC-isolation of the control circuits.

12. The braking system of claim 1, wherein the DC-isolation devices are transducers having their own electronic control devices.

13. The braking system of claim 12, wherein the transducers have converters in both directions.

14. The braking system of claim 12, wherein the transducers each have communications interfaces.

15. A braking system for vehicles, comprising:
    at least one first brake circuit; and
    at least one second brake circuit, wherein the at least one first brake circuit and the at least one second brake circuit each have an electrical control circuit, which respectively has an electronic control unit and its own power supply device, and brake actuating devices which are activatable by the electronic control units, at least one of the brake actuating devices being activatable by more than one of the electronic control units;
    wherein the brake circuits are electrically activatable via a foot brake valve, and the foot brake valve has two electrical braking transmitter devices which are each connected to the electronic control units so that they are DC-isolated,
    wherein the two power supply devices are batteries, a second battery being connected to a first battery via a DC-isolation device and being chargeable via the first battery, and
    wherein the DC-isolation device has an electronic monitoring unit to monitor states of charge of the batteries, the electronic monitoring unit being switchable to a charge reversal state in which the first battery is charged by the second battery, and wherein the electronic monitoring unit uses a generator to control the charging of at least one of the first battery and the second battery.

16. The braking system of claim 15, wherein the electronic monitoring unit is connectable to other electrical or electronic vehicle systems, so that it is DC-isolated, in order to transmit a state of charge of the batteries.

17. A braking system for vehicles, comprising:
    at least one first brake circuit; and
    at least one second brake circuit, wherein the at least one first brake circuit and the at least one second brake circuit each have an electrical control circuit, which respectively has an electronic control unit and its own power supply device, and brake actuating devices which are activatable by the electronic control units, at least one of the brake actuating devices being activatable by more than one of the electronic control units;
    wherein the brake circuits are electrically activatable via a foot brake valve, and the foot brake valve has two electrical braking transmitter devices which are each connected to the electronic control units so that they are DC-isolated,
    wherein the brake actuating devices are electropneumatic pressure regulation modules, and wherein there are at least two separate pneumatic supply circuits for supplying the pressure regulation modules with brake pressure, and
    wherein the first brake circuit is a service brake circuit and the second brake circuit is an emergency brake circuit which assumes the function of the first brake circuit in regular rotation under the control of the electronic control units, the non-active brake circuit respectively being checked, and the pressure regulation modules each being connected to the service brake circuit and to the emergency brake circuit via a high-pressure selection valve, the high-pressure selection valve transmitting the higher of the brake pressures, which are provided by the two brake circuits, to the associated pressure regulation module.

18. The braking system of claim 17, wherein a pressure regulation module of the service brake circuit and a pressure regulation module of the emergency brake circuit are respectively connected upstream of each of the high-pressure selection valves.

19. The braking system of claim 17, wherein the first supply circuit is formed by two subsupply circuits which are each connected to their own associated pressure-medium store, the first subsupply circuit being assigned to a first group of pressure regulation modules of the first brake circuit and the second subsupply circuit being assigned to a second group of pressure regulation modules of the first brake circuit.

20. The braking system of claim 19, wherein the two subsupply circuits are each assigned to an axle or group of axles.

21. The braking system of claim 17, wherein the second brake circuit has its own pressure-medium store, and wherein the brake pressure from the second brake circuit is appliable to all of the high-pressure selection valves via associated pressure regulation modules of the second brake circuit.

22. The braking system of claim 21, wherein a parking valve and a trailer control valve are connected to the pressure-medium store of the second brake circuit.

23. The braking system of claim 22, wherein the parking valve is electrically connected to each of the two electronic control units.

24. The braking system of claim 22, wherein the trailer control valve is activatable by the two electronic control units, and wherein a logic device is included to switch through only that control signal which results in the trailer vehicle being decelerated to a greater extent.

25. The braking system of claim 22, wherein the parking brake valve has electropneumatic function valves, locking valves and pressure sensors.

26. The braking system of claim 25, wherein the locking valves block the control systems with respect to one another as regards actuation of the parking brake valve.

27. The braking system of claim 17, wherein a respective wheel speed sensor is connected to each pressure regulation module, each wheel respectively being assigned two wheel speed sensors.

28. A braking system for vehicles, comprising:
at least one first brake circuit; and
at least one second brake circuit, wherein the at least one first brake circuit and the at least one second brake circuit each have an electrical control circuit, which respectively has an electronic control unit and its own power supply device, and brake actuating devices which are activatable by the electronic control units, at least one of the brake actuating devices being activatable by more than one of the electronic control units;
wherein the brake circuits are electrically activatable via a foot brake valve, and the foot brake valve has two electrical braking transmitter devices which are each connected to the electronic control units so that they are DC-isolated, and
wherein, if at least one pneumatic circuits fails, a pressure distribution device for charging and isolating the pneumatic circuits still allows the normal supply pressure in the fault-free circuits, and an electronic communications system is connected.

* * * * *